United States Patent Office 2,868,724
Patented Jan. 13, 1959

2,868,724
SEQUESTERING PROCESS

John D. Zech, Wilmington, Del., assignor to Atlas Powder Company, Wilmington, Del., a corporation of Delaware No Drawing. Application February 12, 1954
Serial No. 410,033

14 Claims. (Cl. 210—58)

The present invention relates to a new process for sequestering polyvalent heavy metal ions. More particularly, it relates to a new and useful process for sequestering polyvalent heavy metal ions having an atomic number greater than 24. It is a continuation-in-part of my application Serial No. 379,306, filed September 9, 1953, now Patent No. 2,789,976.

It is an object of the present invention to provide a new process for sequestering polyvalent heavy metal ion having an atomic number greater than 24 in aqueous solutions.

It is another object of the present invention to provide a method for avoiding the precipitation of the water insoluble salts of polyvalent heavy metals having an atomic number greater than 24.

It is a further object of the present invention to provide a process that will permit the sequestration of polyvalent heavy metal ions having an atomic number greater than 24 in the presence of alkaline earth ions such as calcium and magnesium, without sequestering the said alkaline earth ions.

The above and other objects and advantages will become obvious to those skilled in the art from the following discussion and disclosure.

Trace metal ions are a source of constant difficulty in many industrial and commercial processes. An increasing awareness of the advantages to be gained by eliminating some of these trace metal ions has served to intensify the search for sequestering agents or chelating agents in the chemical industry. Today the salts of ethylene diamine tetra acetic acid find wide use in this field as sequestering agents, chelating agents and complexing agents, which terms have by common consent come to be used interchangeably as meaning any compound that will inactivate a polyvalent metallic ion.

However, the salts of ethylene diamine tetra acetic acid display little or no selectivity in complexing various undesirable ions. In many industrial processes where polyvalent heavy metal ions having an atomic number greater than 24 are objectionable, the presence of the alkaline earth metals or metals with an atomic number less than 25 may be tolerated, or even desired. If one uses a conventional sequestrant, such as a sodium salt of ethylene diamine tetra acetic acid, the cost of complexing the undesirable ions is raised since such a complexing agent exhibits limited selectivity and chelates both the desirable and tolerable ions as well as the undesirable ions. The process of the present invention permits one to sequester the objectionable said polyvayent heavy metal ions without interfering with the alkaline earth ions or other metal ions that may be present. Such a selective process permits a greater efficiency in the use of sequestrants, thus lowering operating costs. In many industrial processes it is desirable to have a sequestrant for the said heavy metal ions which has a high chelating efficiency over a very wide pH range since marked changes in pH may occur in the process. With the sequestrants that are commercially available today, we find that complexing efficiency often drops to almost zero under certain pH changes, making it necessary to use two or more sequestrants, in order to effectuate complexing efficiency for the said heavy metal ions or what is even more expensive, making it necessary to readjust the pH in order to attain effective chelation.

I have now discovered that a certain group of carboxyalkyl hexityl amines and their alkali salts are excellent sequestrants and in many cases certain specific compounds far exceed any of the salts of ethylene diamine tetra acetic acid in sequestering powers for certain heavy metal polyvalent ions.

The carboxyalkyl hexityl amines that are used for sequestering polyvalent higher metal ions contain no more than two carboxyl carbon atoms and may be represented by the following generic formula:

$$(C_6H_{13}O_5)-N\begin{bmatrix} -(R)_a \\ -(C_nH_{2n}COOY)_b \\ -\begin{pmatrix} CHCOOY \\ | \\ CH_2COOY \end{pmatrix}_c \\ -CH\begin{matrix} COOY \\ \diagdown \\ COOY_d \end{matrix} \end{bmatrix}$$

wherein the empirical radical $(C_6H_{13}O_5)$ represents the hexane pentol residue of a hexityl amine; R is selected from the group consisting of hydrogen, lower alkyl containing 1 to 3 carbon atoms and lower hydroxyalkyl containing 2 to 3 carbon atoms, Y is selected from the group consisting of hydrogen and monovalent alkali metals, $n$ is 1 to 2
$a$ is 0 to 1
$b$ is 0 to 2
$c$ is 0 to 1
$d$ is 0 to 1
$a+b+c+d=2$ A hexityl amine is an amine derivative of a hexitol such as sorbitol, mannitol, dulcitol, etc., wherein any one of the hydroxyl groups has been replaced by an amine group. Such hexityl amines are conveniently prepared by the catalytic reduction of a hexose in the presence of ammonia or a suitable primary amine.

Among the specific compounds that are useful for the purposes of this invention are the following: N-methyl N-carboxymethyl glucamine, N-methyl N-carboxyethyl glucamine, N-ethyl N-carboxymethyl glucamine, N-ethyl N-carboxyethyl glucamine, glucamine diacetic acid, and glucamine dipropionic acid, N-methyl N-glucyl aspartic acid, N-ethyl N-glucyl aspartic acid, N-methyl N-glucyl amino malonic acid, N-ethyl N-glucyl amino malonic acid, N-2-hydroxyethyl N-carboxymethyl glucamine, N-carboxymethyl glucamine, N-methyl N-carboxymethyl fructamine, N,N-bis carboxymethyl fructamine, N-glucyl aspartic acid, N-fructyl aspartic acid, N-glucyl aminomalonic acid, N-fructyl aminomalonic acid, N-methyl N-fructyl aminomalonic acid, N-carboxymethyl fructamine, N-propyl N-carboxymethyl glucamine, etc. By the term "glucyl" is meant the pentahydroxy hexityl radical of a glucamine, and by the term "fructyl" is meant the pentahydroxy hexityl radical of a fructamine. It is to be observed that the sodium salts of the aforementioned compounds are customarily used in the sequestering processes here claimed, especially at high pH. N-methyl N-carboxymethyl glucamine and its alkali metal salts appear to be especially valuable as a sequestering agent as will appear later, and are therefore preferred.

The N-substituted, N-glucyl aspartic acid compounds may be prepared in a manner similar to that outlined in the following synthesis of N-methyl N-glucyl aspartic acid. A solution of 81 gms. of NaOH in 150 cc. of water was added to a mixture of 98 gms. of maleic anhydride and 200 cc. of water with cooling and agitation. To the resulting solution of disodium maleate was added 195 gms. of methyl glucamine. The solution was heated to 109° C. and refluxed at that temperature for 21 hours. After cooling, the solution was diluted to a volume of 1 liter with distilled water. It was a solution of the disodium salt of N-methyl N-glucyl aspartic acid, having a concentration of approximately 1 mole per liter. The alkyl glucamine malonic acids and their salts may be prepared by reacting an alkyl glucamine and a halogen substituted malonic acid, such as chloromalonic acid or bromomalonic acid, under conditions similar to the preparation of the N-alkyl N-glucyl aspartic acid compounds.

The N-alkyl N-carboxyalkyl hexityl amines are prepared as outlined in my copending application Serial No. 379,306, and it is accordingly not necessary to repeat the details of the method of preparation here. The N-N-bis (carboxyalkyl) hexityl amines such as glucamine diacetic acid may be prepared as follows:

33.4 gms. of monochloracetic acid was dissolved in 100 cc. of water and neutralized at 0 to 2° C. by the addition of 14.5 gms. of NaOH in 50 cc. of water during 5 minutes. 32 gms. of glucamine was added to the cold solution of sodium chloracetate. The temperature was raised to 80° C. by the application of heat. After the exothermic reaction had subsided, the temperature was raised to 101° C. and held there for another hour. After cooling the solution was diluted to 250° cc. by the addition of distilled water. It was a solution of glucamine diecetic acid having a concentration of approximately 0.7 mole per liter.

The tables below adequately show efficiencies of the compounds in question as sequestering agents for polyvalent heavy metal ions. So that the data may be presented in tabular form, certain abbreviations became necessary. In Table No. 1 the sequestrants are numbered from 1 to 5 and they are identified below opposite their corresponding number with their molarity indicated as used in Table No. 1.

No.:                                                       Mol
1 N-methyl N-carboxymethyl glucamine _____ 1.0
2 N-methyl N-carboxyethyl glucamine _____ 1.0
3 N-ethyl N-carboxymethyl glucamine _____ 0.8
4 Glucamine diacetic acid _____ 0.8
5 N-methyl N-glucyl aspartic acid _____ 0.7

In order to determine the complexing capacity of these compounds for heavy metal ions having an atomic number greater than 24, in dilute solutions, in the pH range from about 4 to 11, dilute solutions of the metal ions were made up containing measured amounts of the compounds above. These solutions were titrated with standard dilute alkali, withdrawing small samples (10 cc. at pH intervals of about 0.25 to 1) and storing them for about a week in separate bottles. These samples were observed for the presence of precipitates. By following this procedure it was possible to determine the amount of sequestering agent required to prevent the precipitation of known amounts of heavy metal ions in the pH range of about 4 to 11.

In many cases clear solutions were obtained initially over the entire pH range but on standing, precipitates would appear within certain pH limits. In most cases precipitation would show up within 24 to 48 hours if the quantity of complexing agent was insufficient to complex all of the metal present. These titrations were repeated, increasing or decreasing the ratio of metal ion to complexing agent until the minimum amount of complexing agent, which would produce clear solutions over the entire pH range from about 4 to 11 was found.

In this work the following metal salt solutions were used at the indicated concentrations:

Molar
$Fe(NO_3)_3$ _____ ½
$FeSO_4(NH_4)_2SO_4$ _____ ½
$CuSO_4$ _____ ½
$Pb(NO_3)_2$ _____ ½
$MnCl_2$ _____ ½
$NiSO_4$ _____ 0.47
$Co(NO_3)_2$ _____ 0.456
$ZnCl_2$ _____ 0.414

This work is summarized in Table No. 1. In some cases the solutions had to be acidified initially with nitric acid to lower the pH so that the range of 4 to 11 could be covered by the titrations. The table shows the minimum amount of complexing agent required to prevent the precipitation of metal in the pH range of 4 to 11 For the most part, the complexing capacity of these compounds is greater at high pH than at weakly alkaline pH levels. The last column of the table shows approximate pH ranges in which precipitation of metal will first occur if the amount of complexing agent is decreased below the levels shown in the table.

SEQUESTRATION OF METAL IONS IN DILUTE SOLUTION BY N-CARBOXYALKYL HEXITYL AMINES

Table 1

| Example | cc. water | cc. metal salt | salt used | approx. p. p. m. metal | cc. sequestrant | sequestrant used | approx. mole ratio seq./metal | pH range of first precipitation |
|---|---|---|---|---|---|---|---|---|
| 1 | 400 | 6 | $Fe^{++}$ | 400 | 11.0 | 2 | 3.67 | 7-9 |
| 2 | 400 | 6 | $Fe^{++}$ | 400 | 2.0 | 5 | 0.67 | 8-11 |
| 3 | 400 | 6 | $Fe^{++}$ | 400 | 3.5 | 4 | 0.83 | 8-11 |
| 4 | 400 | 6 | $Fe^{++}$ | 400 | 2.25 | 1 | 0.75 | 8-11 |
| 5 | 400 | 6 | $Fe^{++}$ | 400 | 3.0 | 3 | 0.80 | 4-7 |
| 6 | 400 | 1.5 | $Fe^{+++}$ | 100 | 0.48 | 1 | 0.64 | 5-6 |
| 7 | 400 | 1.5 | $Fe^{+++}$ | 100 | 3.0 | 2 | 4.0 | 5-8 |
| 8 | 400 | 1.5 | $Fe^{+++}$ | 100 | 0.75 | 3 | 0.8 | 5-7 |
| 9 | 400 | 1.5 | $Fe^{+++}$ | 100 | 0.70 | 4 | 0.67 | 5-6 |
| 10 | 400 | 1.5 | $Fe^{+++}$ | 100 | 0.85 | 5 | 1.13 | 3.5-6 |
| 11 | 400 | 1.5 | $Cu^{++}$ | 120 | 0.36 | 1 | 0.48 | 7-9 |
| 12 | 400 | 1.5 | $Cu^{++}$ | 120 | 0.60 | 2 | 0.80 | 7-9 |
| 13 | 400 | 1.5 | $Cu^{++}$ | 120 | 0.50 | 3 | 0.50 | 6-8 |
| 14 | 400 | 1.5 | $Cu^{++}$ | 120 | 1.37 | 4 | 1.30 | 6-7 |
| 15 | 400 | 1.5 | $Cu^{++}$ | 120 | 0.50 | 5 | 0.67 | 6-7 |
| 16 | 400 | 6.0 | $Ni^{++}$ | 400 | 1.56 | 1 | 0.55 | 8-10 |
| 17 | 400 | 6.0 | $Ni^{++}$ | 400 | 2.5 | 4 | 0.63 | 8-10 |
| 18 | 400 | 6.0 | $Ni^{++}$ | 400 | 2.0 | 5 | 0.71 | 8-10 |
| 19 | 400 | 1.5 | $Co^{++}$ | 100 | 0.18 | 1 | 0.26 | 11 |
| 20 | 400 | 6.0 | $Co^{++}$ | 400 | 1.5 | 2 | 0.55 |  |
| 21 | 400 | 6.0 | $Co^{++}$ | 400 | 1.85 | 4 | 0.48 | 9-10 |
| 22 | 400 | 6.0 | $Co^{++}$ | 400 | 1.5 | 5 | 0.55 | 8-10 |
| 23 | 400 | 6.0 | $Pb^{++}$ | 1,500 | 2.25 | 1 | 0.75 |  |
| 24 | 400 | 6.0 | $Pb^{++}$ | 1,500 | 12.0 | 2 | 4.85 | 6-10 |
| 25 | 400 | 6.0 | $Pb^{++}$ | 1,500 | 3.5 | 3 | 0.67 |  |
| 26 | 400 | 6.0 | $Pb^{++}$ | 1,500 | 6.0 | 4 | 1.41 | 7-9 |
| 27 | 400 | 6.0 | $Pb^{++}$ | 1,500 | 4.5 | 5 | 1.5 | 6-8 |
| 28 | 400 | 6.0 | $Zn^{++}$ | 400 | 3.0 | 1 | 1.2 | 7-9 |
| 29 | 400 | 6.0 | $Zn^{++}$ | 400 | 18.0 | 2 | 7.25 | 7-11 |
| 30 | 400 | 6.0 | $Zn^{++}$ | 400 | 4.0 | 3 | 1.30 | 7-9 |
| 31 | 400 | 6.0 | $Zn^{++}$ | 400 | 6.0 | 4 | 1.7 | 8-9 |
| 32 | 400 | 6.0 | $Zn^{++}$ | 400 | 4.0 | 5 | 1.6 | 7-9 |
| 33 | 400 | 1.5 | $Mn^{++}$ | 100 | 0.26 | 1 | 0.34 | 8.5-11 |
| 34 | 400 | 6.0 | $Mn^{++}$ | 400 | 4.0 | 4 | 0.94 | 11 |
| 35 | 400 | 6.0 | $Mn^{++}$ | 400 | 1.75 | 5 | 0.58 | 11 |

Table No. 2 represents the comparative data for complexing said polyvalent heavy metal ions in strong alkali. The sequestrants used are numbered below and their concentration indicated.

No.: 1 N-methyl N-carboxymethyl glucamine in a 1 molar solution (22% solution)
   6 A 47% solution of the sodium salt of diethanol amine acetic acid
   7 Ethylene diamine tetra acetic acid disodium salt (186 gms. per liter of water)

In this case the solutions were made up and allowed to stand for about a week to determine if any precipitation would occur. The experiments were repeated varying the ratio of metal ion and complexing agent until the minimum amount of complexing agent was found which would keep the metal in solution. These experiments show that sequestrants #6 and 7, both commercially available sequestrants, have no value for complexing iron in strongly alkaline solutions.

COMPLEXING OF METAL IONS IN STRONG ALKALI

Table 2

| Example | cc. complexing agent | complexing agent | cc. salt | Salt used | cc. 40% NaOH | cc. H₂O | |
|---|---|---|---|---|---|---|---|
| 36 | 3.3 | 1 | 10 | $Fe^{+++}$ | 8 | | Clear light colored solution. |
| 37 | 2 | 1 | 10 | $Fe^{+++}$ | 8 | | Clear medium dark red solution. |
| 38 | 1 | 1 | 10 | $Fe^{+++}$ | 8 | | Clear dark red solution. |
| 39 | 3.3 | 6 | 10 | $Fe^{+++}$ | 8 | | Precipitation. |
| 40 | 10 | 7 | 2.5 | $Fe^{+++}$ | 10 | | Do. |
| 41 | 1 | 1 | 4.5 | $Co^{++}$ | 8 | | Very slight precipitation. |
| 42 | 1 | 1 | 3.0 | $Ni^{++}$ | 8 | 7 | Clear solution. |
| 43 | 1 | 1 | 4.0 | $Ni^{++}$ | 8 | 6 | Very slight precipitation. |
| 44 | 1 | 1 | 6.0 | $Cu^{++}$ | 8 | | Clear deep blue solution. |
| 45 | 1 | 1 | 7.0 | $Cu^{++}$ | 8 | | Slight precipitation. |
| 46 | 1 | 1 | 3.0 | $Mn^{++}$ | 8 | 7 | Do. |

Table No. 3 clearly shows the superiority of methyl glucamine acetic acid in particular for the complexing of the said metal ions in dilute alkali at high pH.

Here again we see that methyl glucamine acetic acid has a very large complexing capacity for iron at high pH. In this high pH range, methyl glucamine beta-propionic acid (compound 2) appears to have about the same complexing capacity for heavy metal ions as methyl glucamine acetic acid, in contrast to its much poorer performance at lower pH levels. This table also shows that ethylene diamine tetra acetic acid complexes considerable less heavy metal ions at high pH than the N-carboxyalkyl hexityl amines.

oils, electroplating baths, cosmetic formulation and the like. The following discussion of more specific applications of the herein described sequestering process, is not to be construed as limiting this invention in any way, but is offered only to show the broad scope of the present invention.

In the soap industry, it is known that the presence of trace metal ions in soap formulations often causes rancidity and discoloration of the soap product. The use of any of the compounds covered by the generic formula previously given, complexes these undesirable heavy metal ions, thus curtailing oxidation and the development of undesirable odors, even over long storage periods. One of the ever present problems of the cosmetic industry, is the prevention of oxidation of formula ingredients, which oxidation is known to be catalyzed by the presence of trace metals such as copper, manganese and iron. Here again, low concentrations of the compounds of the present invention offer a ready remedy to this problem.

In leather dyeing, the presence of certain trace metals cause undesirable shade modifications. By the present process for sequestering heavy metal ions, this difficulty is avoided. The compounds in question may be used in a bath prior to the dyeing operation, or in the dye bath itself. It is known that casein paints discolor quite rapidly when $Fe^{+++}$ or $Fe^{++}$ ions are present. Other heavy metal ions may have a deleterious effect on the service life of the emulsion, and the finished film of resin emulsion paints. N-methyl N-carboxymethyl glucamine should be extremely effective in overcoming these problems by forming stable complexes with offending metal ions. The paper industry is constantly seeking methods to avoid the discoloration of pulp to be used for the COMPLEXING OF METAL IONS IN DILUTE ALKALI AT HIGH pH Table 3

| Example | cc. complexing agent | complexing agent | cc. salt | Salt used | cc. H₂O | cc. 4 N NaOH | pH | |
|---|---|---|---|---|---|---|---|---|
| 47 | 0.5 | 1 | 6.67 | $Fe^{+++}$ | 50 | 20 | 13.1 | Clear deep red solution. |
| 48 | 1 | 1 | 4.0 | $Ni^{++}$ | 50 | 18 | 13.2 | Clear solution. |
| 49 | 1 | 2 | 4.0 | $Ni^{++}$ | 50 | 18 | 13.2 | Do. |
| 50 | 2 | 7 | 2.0 | $Ni^{++}$ | 50 | 22 | 13.3 | Do. |
| 51 | 2 | 7 | 2.15 | $Ni^{++}$ | 50 | 17 | 11.8 | Very slight precipitation. |
| 52 | 1 | 1 | 2.0 | $Mn^{++}$ | 50 | 20 | 13.3 | Slight precipitation. |
| 53 | 1 | 2 | 2.0 | $Mn^{++}$ | 50 | 20 | 13.2 | Do. |
| 54 | 2 | 7 | 1.0 | $Mn^{++}$ | 50 | 2.5 | 13.1 | Precipitation. |
| 55 | 1 | 1 | 4.25 | $Cu^{++}$ | 50 | 18.75 | 13.2 | Clear solution. |
| 56 | 1 | 2 | 4.0 | $Cu^{++}$ | 50 | 20 | 13.3 | Do. |
| 57 | 2 | 7 | 2.0 | $Cu^{++}$ | 50 | 20 | 13.3 | Do. |
| 58 | 2 | 7 | 2.15 | $Cu^{++}$ | 50 | 0.95 | 12.3 | Precipitation. |
| 59 | 1 | 1 | 6.0 | $Co^{++}$ | 50 | 20 | 13.1 | Clear solution. |
| 60 | 2 | 7 | 2.0 | $Co^{++}$ | 50 | 18.0 | 13.3 | Do. |
| 61 | 2 | 7 | 2.15 | $Co^{++}$ | 50 | 2.4 | 12.9 | Precipitation. |

The complexing of heavy metal ions with N-carboxyalkyl hexityl amines has many industrial applications. They may be used to great advantage in a variety of industries. They may be used advantageously for soaps, detergents, dishwashing compounds, cotton textile processing, kier boiling, mercerizing of cotton, bleaching, rayon processing, dyeing, soaker alkali operations, boiler treatment, rubber compounding, purification of fats and manufacture of fine paper. The present sequestering process offers an effective method of curing such pulp discoloration as is caused by the presence of trace metals. It is known that metal impurities in plating baths may be effectively controlled by chelation. Latex formulations are often upset by the presence of undesirable trace metals and the present invention offers an effective method of assuring latex stabilization in such cases. In the textile industries, it is known that trace metals cause uneven dyeing. This is especially true when iron and copper ions are present. The precipitation of iron salt by sodium hydroxide, in mercerizing, can cause stains on the fabric and the accumulation of scum on the equipment. The hot sodium hydroxide employed in kier boiling cotton can cause serious iron precipitation. These iron hydroxide precipitates not only produce stains and interfere with dyeing, but they exert a catalytic action on the decomposition of the peroxide bleach causing degradation of the cellulose. In the production of viscose rayon, trace quantities of lead may cause discoloration of the rayon. The above difficulties in the textile industry may be avoided by the use of the process of this invention to complex polyvalent heavy metal ions.

It is known that in certain regions of the United States, some plants and trees suffer from a disease known as iron chlorosis. The compounds used in this invention may be used to sequester iron and these iron complexes may then be used to supply iron to growing plants and trees to combat this disease. The compounds employed in the present invention may be used in the preparation of silica gels wherein they function to prevent the precipitation of heavy metals within the gel structure. In this way, special silica gels may be prepared containing heavy metals evenly dispensed throughout the gel structure. Thus it is possible to prepare an iron solution complexed with N-methyl N-carboxymethyl glucamine to be added to a solution of sodium silicate without precipitation of iron salts. This solution may then be treated with sufficient acid to cause gelation, thus producing a clear gel with the iron evenly distributed throughout same. Silica gels containing other heavy metals may be prepared in a similar fashion. Such silica gels may be used in a number of ways such as catalysts in the cracking of petroleums, etc. Special silica gel compositions containing a number of metal ions may be prepared and used to supply trace elements to soils deficient as to said elements.

The herein described process will operate efficiently with any of the polyvalent heavy metals such as $Ce^{++++}$, $Cd^{++}$, $Cu^{++}$, $Fe^{+++}$, $Fe^{++}$, $Sn^{++}$, $Hg^{++}$, $Bi^{+++}$, $Co^{++}$, $Zn^{++}$, $As^{+++}$, $Sb^{+++}$, $Ti^{++++}$, $Zr^{++++}$, $Mn^{++}$, $Ni^{++}$, $Pb^{++}$, etc. The above list is not all inclusive, but merely indicative of the large number of polyvalent metal ions that can be effectively sequestered, and it is not intended that the invention be in any way limited by the said list. The herein described process is most effective on the $Fe^{+++}$, $Cu^{++}$, $Mn^{++}$, $Ni^{++}$ and $Pb^{++}$ ions, and they are accordingly preferred.

It will be obvious to those skilled in the art, that the actual use of the herein described process will vary in some details for use in the many industries to which it is adaptable. In general, however, it will usually be necessary to first determine what polyvalent heavy metal ion or ions must be sequestered. This is accomplished by conventional analytical techniques. It will be helpful to determine the concentration of the offending ion or ions. Then by simple calculation, one can determine the minimum amount of sequestrant needed. This will vary from process to process, depending upon the pH at which the process operates. In general it is recommended that whenever possible it is preferable to add the sequestrant at a pH at which the offending ions are still in solution and which will keep the offending ions in solution, since it is always easier to sequester them while in solution than it is to bring them back into solution, once they have precipitated in the form of insoluble salts. It is to be borne in mind that the tables given here, show merely the minimum amount of sequestrant needed to complex the offending polyvalent heavy metal ion, under the conditions used. In many operating processes, it will be desirable to have a suitable safety factor, and thus use a greater amount of sequestrant, to allow for sudden pH changes in the process, or sudden increases in the concentration of the offending ion or ions, or any other process changes that would effect this sequestering process. The herein defined process may be adapted to either a batch process or a continuous process.

It will be obvious to those skilled in the art that the herein described process is amenable to use in any process requiring the sequestration of polyvalent heavy metals having an atomic number greater than 24. In certain circumstances it may be desirable to use the compounds employed in this invention in conjunction with other sequestrants such as ethylenediamine tetra acetic acid, its salts and derivatives. This is especially true if it is desired to sequester the alkaline earth metals or other metals along with the said polyvalent heavy metals. The herein described method can be adapted to any process requiring the sequestration of polyvalent heavy metal ions wtihout departing from the scope of the present invention.

What I claim is:

1. The process of sequestering polyvalent heavy metal ions having an atomic number greater than 24, which comprises bringing together in solution salts of said heavy metals and a compound containing no more than two carboxyl bearing carbon atoms of the formula

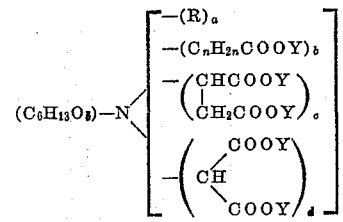

wherein the empirical radical $C_6H_{13}O_5$ represents the hexane pentol residue of a hexityl amine, R is selected from the group consisting of hydrogen, lower alkyl radicals contining 1 to 3 carbon atoms and lower hydroxy alkyl radicals containing 2 to 3 carbon atoms; Y is selected from the group consisting of hydrogen and monovalent alkali metals, and wherein $n$ is 1 to 2
$a$ is 0 to 1
$b$ is 0 to 2
$c$ is 0 to 1
$d$ is 0 to 1
$a+b+c+d=2$.

2. The process as described in claim 1 wherein the polyvalent heavy metal ion is the $Fe^{+++}$ ion.

3. The process as described in claim 1 wherein the polyvalent heavy metal ion is the $Cu^{++}$ ion.

4. The process as described in claim 1 wherein the polyvalent heavy metal ion is the $Mn^{++}$ ion.

5. The process as described in claim 1 wherein the polyvalent heavy metal ion is the $Ni^{++}$ ion.

6. The process as described in claim 1 wherein the polyvalent heavy metal ion is the $Pb^{++}$ ion.

7. The process as defined in claim 1 wherein Y is an alkali metal.

8. The process of sequestering polyvalent heavy metal ions having an atomic number greater than 24, which comprises bringing together in solution, salts of said heavy metals and N-methyl N-carboxymethyl glucamine.

9. The process of sequestering polyvalent heavy metal ions, which comprises bringing together in solution, salts of said heavy metals and N-methyl N-glucyl aspartic acid.

10. The process of sequestering polyvalent heavy metal ions, which comprises bringing together in solution, salts of said heavy metals and N,N-bis carboxymethyl glucamine.

11. The process of sequestering polyvalent heavy metal ions, which comprises bringing together in solution, salts of said heavy metals and N-ethyl N-carboxymethyl glucamine.

12. The process of sequestering polyvalent heavy metal ions, which comprises bringing together in solution, salts of said heavy metals and N-methyl N-carboxymethyl fructamine.

13. The process of sequestering polyvalent heavy metal ions having an atomic number greater than 24, which comprises bringing together in solution salts of said heavy metals and a tertiary amine containing, attached to the nitrogen atom, one hexityl radical and from 1 to 2 carboxyalkyl radicals having from 2 to 3 carbon atoms, any residual valences of the nitrogen being satisfied by an alkyl radical containing up to 3 carbon atoms.

14. The process as defined in claim 13 wherein the said alkyl radical is methyl.

References Cited in the file of this patent

UNITED STATES PATENTS

| | | |
|---|---|---|
| 2,240,957 | Munz | May 6, 1941 |
| 2,396,938 | Bersworth | Mar. 19, 1946 |
| 2,412,945 | Bersworth | Dec. 24, 1946 |
| 2,789,976 | Zech | Apr. 23, 1957 |

OTHER REFERENCES

Turner: "Condensed Chemical Dictionary," 4th ed., New York, Reinhold, 1950, p. 319.

Karrer et al.: Chem. Abstr., vol. 31, 1937, pp. 3012–3013.

UNITED STATES PATENT OFFICE
CERTIFICATE OF CORRECTION

Patent No. 2,868,724January 13, 1959

John D. Zech

It is hereby certified that error appears in the printed specification of the above numbered patent requiring correction and that the said Letters Patent should read as corrected below.

Column 3, line 24, for "diecetic" read -- diacetic --; columns 3 and 4, Table 1, column 6 thereof and opposite Example 25, for "3.5" read -- 2.5 --.

Signed and sealed this 2nd day of June 1959.

(SEAL)
Attest:

KARL H. AXLINE
Attesting Officer

ROBERT C. WATSON
Commissioner of Patents